United States Patent
Wang et al.

(10) Patent No.: US 7,318,733 B2
(45) Date of Patent: Jan. 15, 2008

(54) CARD CONNECTOR WITH EJECTOR

(75) Inventors: Hong-Liang Wang, Kunshan (CN);
Chi Zhang, Kunshan (CN)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 11/591,427

(22) Filed: Oct. 31, 2006

(65) Prior Publication Data

US 2007/0099463 A1    May 3, 2007

(30) Foreign Application Priority Data

Oct. 31, 2005   (CN)   ........................ 2005 2 0076965

(51) Int. Cl.
*H01R 13/62* (2006.01)
(52) U.S. Cl. ...................................... 439/159
(58) Field of Classification Search ............... 439/159, 439/630, 633, 157, 327–328, 345
See application file for complete search history.

(56) References Cited

U.S. PATENT DOCUMENTS

| | | | | |
|---|---|---|---|---|
| 6,572,392 B2* | 6/2003 | Motojima | ................... | 439/159 |
| 6,585,542 B2* | 7/2003 | Nishio et al. | ............... | 439/630 |
| 6,652,300 B2* | 11/2003 | Nishioka | ................... | 439/159 |
| 6,761,569 B2* | 7/2004 | Nakamura | ................... | 439/159 |

\* cited by examiner

*Primary Examiner*—J. F. Duverne
(74) *Attorney, Agent, or Firm*—Wei Te Chung

(57) ABSTRACT

A card connector adapted for receiving a card which has a notch on a side, comprises an insulating housing defining a card insertion/ejecting direction, a plurality of contacts and an ejector. The ejector comprises a slider movable along the card insertion/ejecting direction, a spring member and a locking member for locking the slider. The slider has a protruding portion for engaging with the notch of the card, the slider is able to move away from the card inserted into the card connector at an original position to allow the protruding portion to leave the notch of the card, and is limited to move away from the card at a final position to lock the protruding portion of the slider in the notch of the card and prevent the card from being pull out at the final position.

14 Claims, 7 Drawing Sheets

CARD CONNECTOR WITH EJECTOR

BACKGROUND OF THE INVENTION

1. Field of the Invention

The present invention is generally related to a card connector, and especially to a card connector which is adapted for insertion/ejecting of a card.

2. Description of Related Art

Card connectors are widely used in variety electrical equipments for building electrical paths between the electrical equipments and electrical cards, which are used as storage devices. Usually, card connectors are provided with ejectors to eject the cards received in the card connectors, and some have locking members disposed on the ejectors to prevent the cards from pulling out by mistake during working.

TW Pat. No. 507956 discloses a card connector comprising an insulting housing, a plurality of contacts received the insulting housing and an ejector. The ejector includes a slider, a metal pin, a spring and a latching equipment. The slider is movable along a card inserting/ejecting direction and defines the heart groove on a sidewall thereof; the spring is disposed between the slider and the insulating housing to provide a restoration elasticity for ejecting the card; the metal pin has two ends, one end retained to the insulating housing and the other disposed in and moving along the heart groove. The metal pin and the heart groove form a locking member together to lock the slider and the card at a final position against the restoration elasticity of the compressed spring. The latching equipment includes an elastic arm retained to the slider with a V-shape tail on a free end for engaging with a notch formed on a side of the card and a gap defined on a sidewall of the insulating housing adjacent to the slider. When the slider is at an original position, the free end of the elastic arm retained to the slider is able to move outwardly through the gap to allow the V-shape tail leave the notch of the card during an insertion of the card. When the slider is at the final position, the free end of the elastic arm is limited to move outwardly and the tail is kept at the notch of the card to prevent the card from pulling out by mistake. However, the card connector needs an accessional metal elastic arm and the metal elastic should be retained to the insulating housing reliably, so that the latching equipment causes a high cost and a complex manufacture of the card connector, otherwise, the elasticity of the elastic arm will get an elastic distortion after repeat use and may not lock the card to the slider firmly.

Hence, an improved card connector is highly desired to overcome the aforementioned disadvantages of the prior art.

SUMMARY OF THE INVENTION

Accordingly, an object of the present invention is to provide a card connector, which is formed with an ejector with a firm ejecting arm.

To achieve the above object, a card connector adapted for receiving a card which has a notch on a side, comprises an insulating housing defining a card insertion/ejecting direction, a plurality of contacts retained in the insulating housing and an ejector. Each contact comprises a contacting portion, a retaining portion retained to the insulating housing and a soldering portion. The ejector comprises a slider movable along the card insertion/ejecting direction, a spring member urging the slider toward the card ejecting direction and a locking member for locking the slider. The slider defines an original position and a final position related to the insulating housing and has an ejecting arm for ejecting the card and a protruding portion for engaging with the notch of the card, the slider is able to move away from the card inserted into the card connector at the original position to allow the protruding portion to leave the notch of the card, and is prevented from moving away from the card at the final position to lock the protruding portion of the slider in the notch of the card and prevent the card from being pull out at the final position.

Other objects, advantages and novel features of the present invention will be drawn from the following detailed description of a preferred embodiment of the present invention with attached drawings.

DETAILED DESCRIPTION OF THE INVENTION

Reference will now be made in detail to the preferred embodiment of the present invention.

Figure 1:
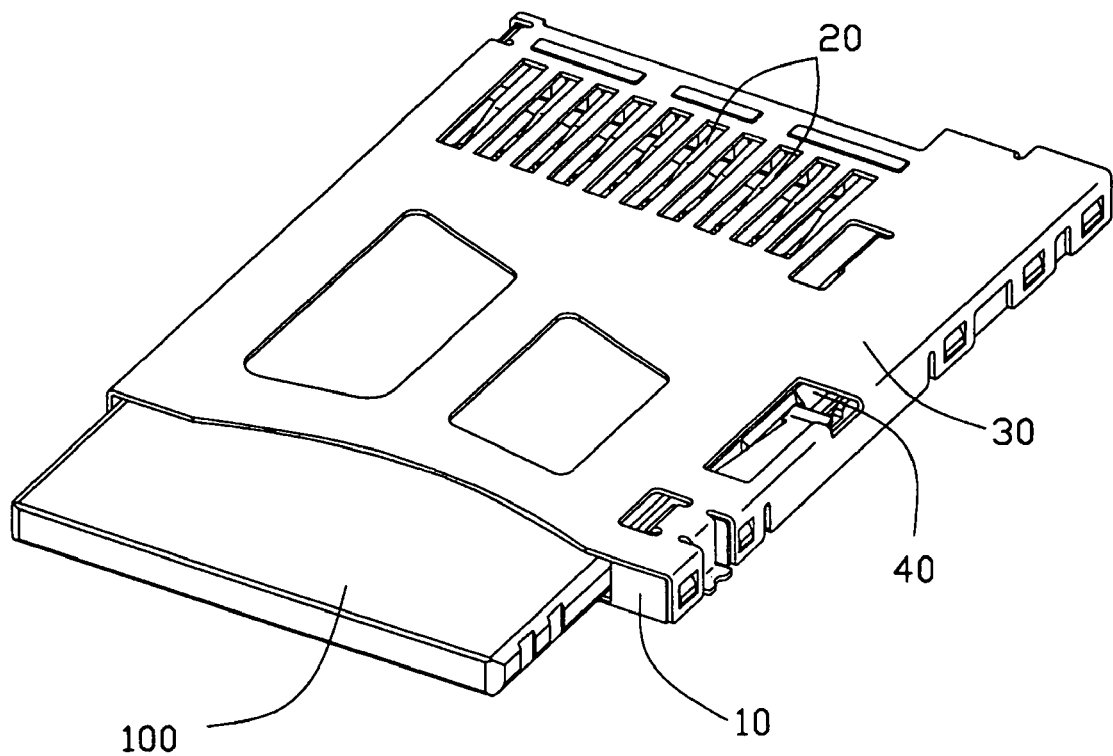
FIG. 1 is an assembled, perspective view of a card connector in accordance with the present invention with a card therein.
Figure 2:
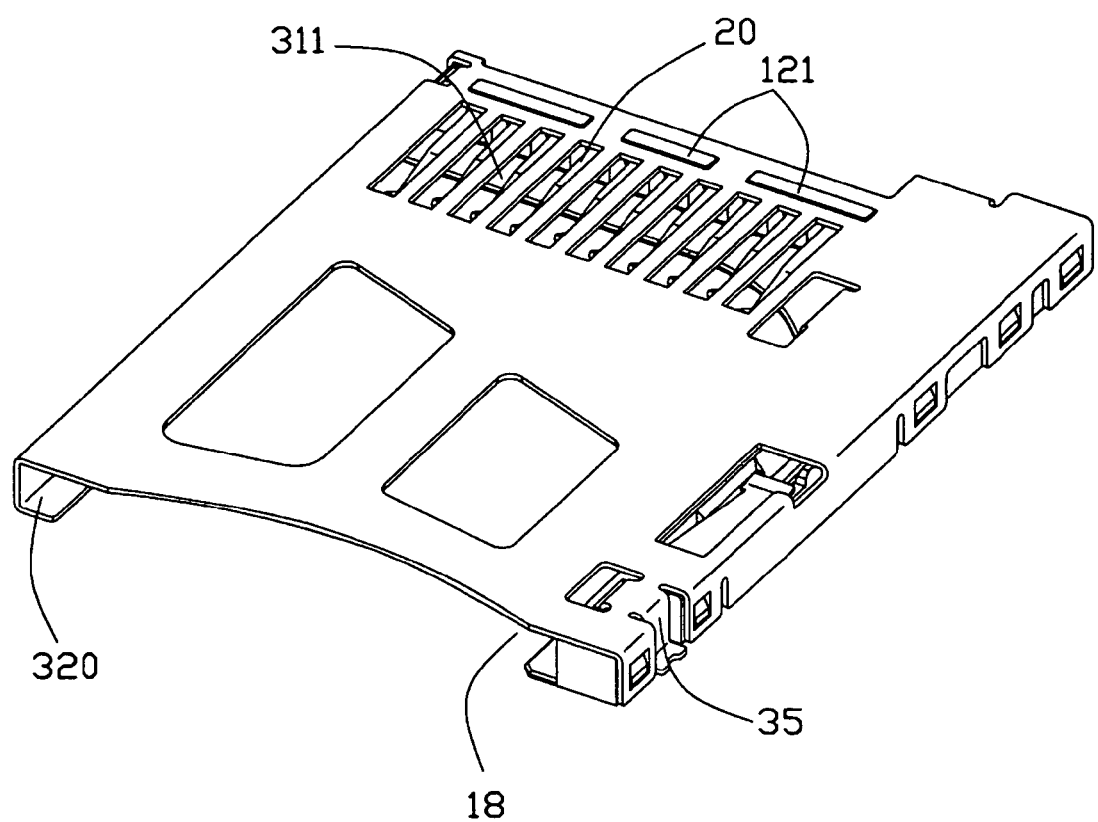
FIG. 2 is an assembled, perspective view of the card connector in accordance with the present invention without the card therein.

Referring to FIG. 1 and FIG. 2, the card connector in accordance with the present invention is adapted for receiving a card 100. The card connector comprises an insulating housing 10, a plurality of contacts 20 received in the insulating housing 10, a metal shell 30 covering the insulating housing 10 and an ejector (not labeled) for ejecting the card 100 when received in the card connector.

Figure 3:
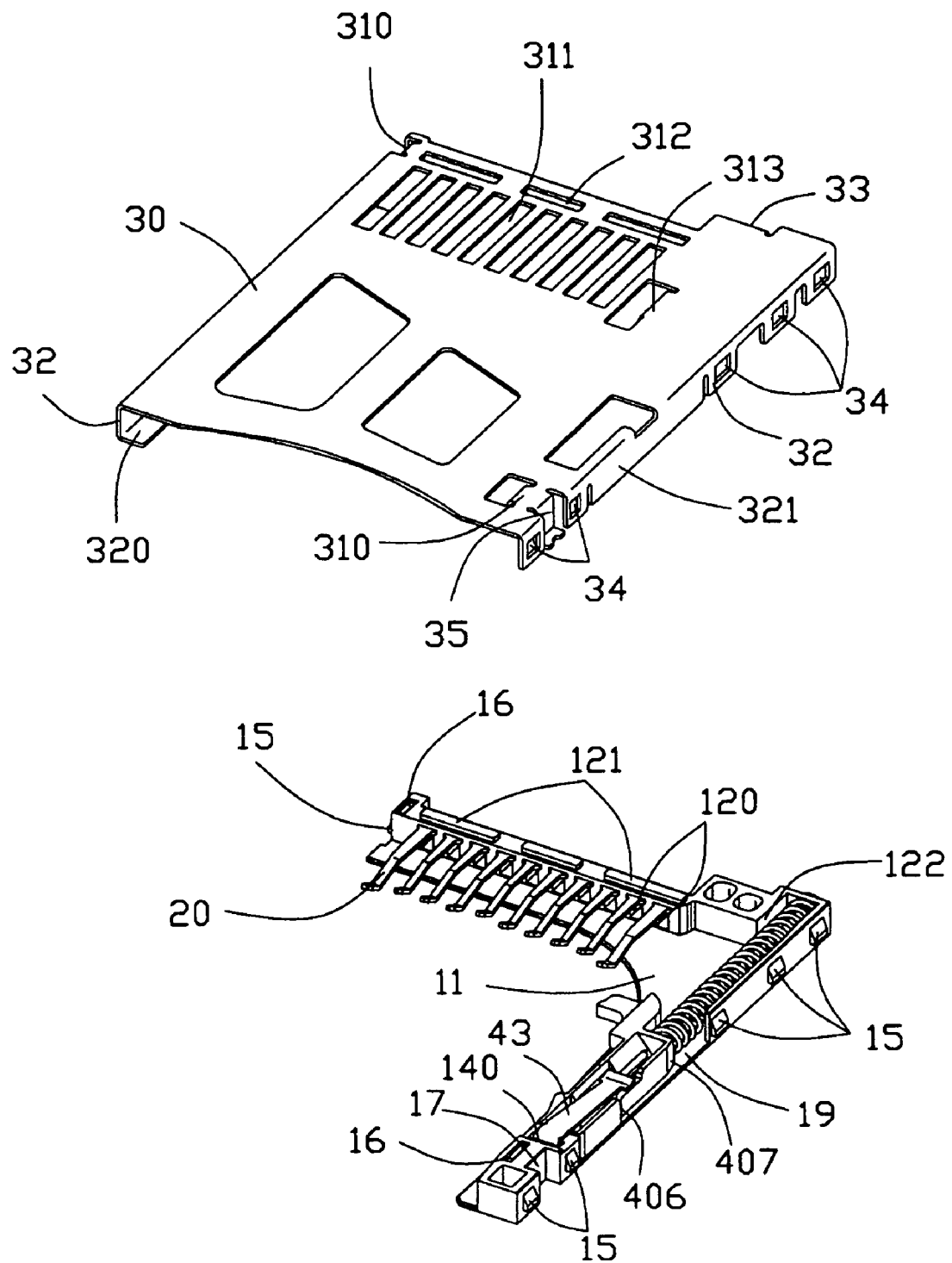
FIG. 3 is another perspective view of the card connector, wherein a metal shell is detached from an insulating housing.
Figure 4:
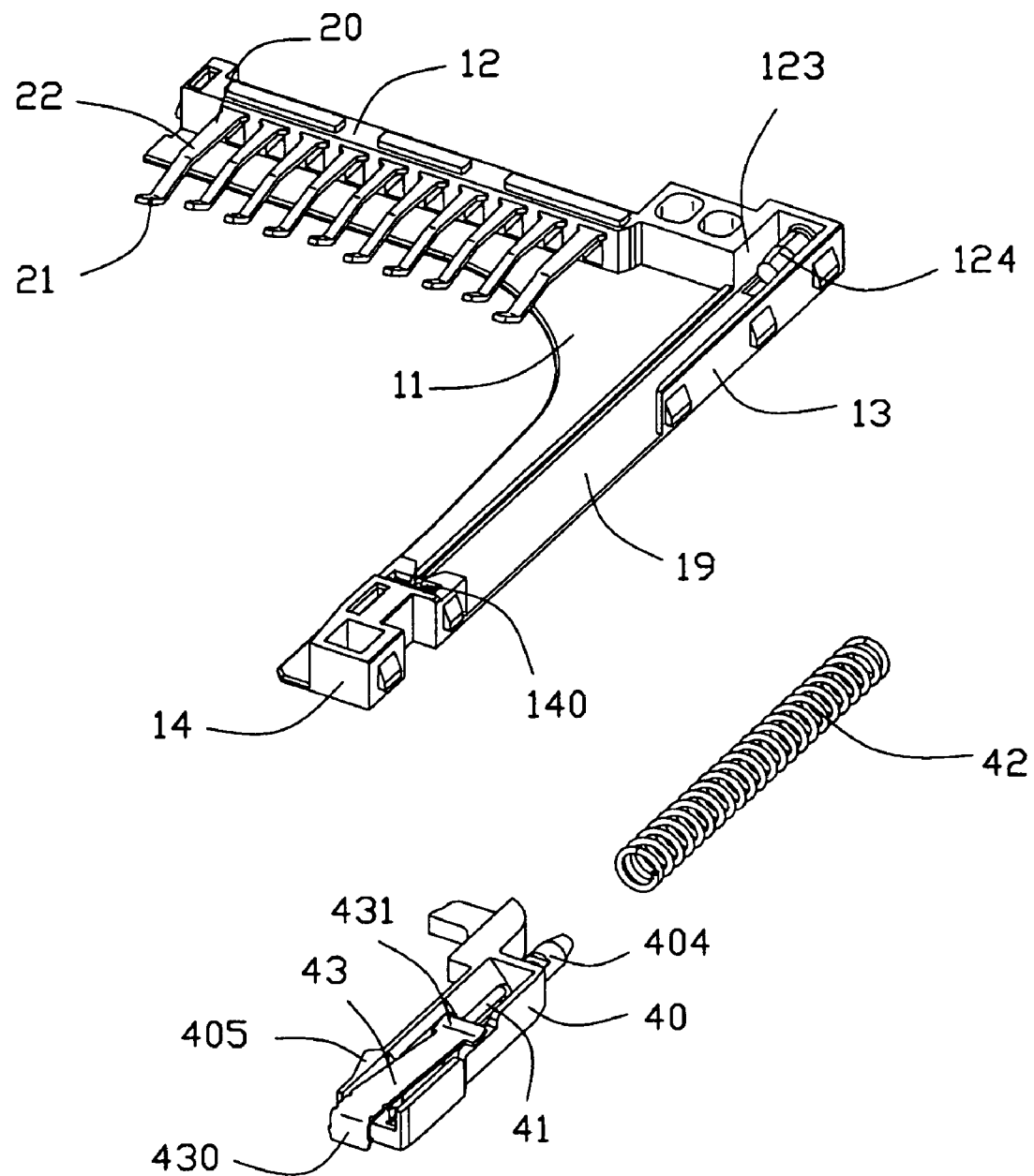
FIG. 4 is a assembled, perspective view the insulating housing and an ejector of the card connector in accordance with the present invention.

Referring to FIG. 3 and FIG. 4, the insulating housing 10 is approximately in an L-shape and is formed with a L-shaped bottom wall 11, a front wall 12 and a right sidewalls 13 extending upwardly from a front and a right sides of the bottom wall 11. The right sidewall 13 is linking with the front wall 12 and disposed in a front part of the right side of the bottom wall 11, the insulating housing 10 is formed with a rear portion 14 with an aperture 140 in a bottom right corner of the bottom plate 11. The front wall 12 has a plurality of passages 120 extending in a front-and-rear direction, a plurality of raised rids 121 on a top surface thereof, and a blocking wall 122 defining a limit slot 123 between the right sidewall 13. A column 124 protrudes rearward into the limit slot 123 from the front wall 12. A plurality of protruding ribs 15 are provided on corresponding outside surfaces of the front wall 12, the right sidewall 13 and the rear portion 14. Two gaps 16 are defined respectively in the front wall 12 and the rear portion 14. A groove 17 is recessed from an outside surface of the rear portion 14.

Each contact 20 comprises a contacting portion 21, an intermediate portion 22 extending forward from the contacting portion 21, a retaining portion retained in the passages 120 of the insulating housing 10 and a soldering portion (not shown) extending out of the insulating housing 10 to be soldered to a print circuit board (not shown).

Referring to FIG. 2 and FIG. 3, the metal shell 30 is stamped from a metal piece and comprises a top plate 31, two sidewalls 32 bended downwardly from opposed lateral sides of the top plate 31 and a front wall 33 bended from a front edge of the top plate 31, wherein the left side wall 32 further bended inwardly to defines a guiding slot 320. The top plate 31 is formed with a pair of upright slice 310, a plurality of long holes 311 and a plurality of holes 312, the sidewalls 32 and the front wall define a plurality of latching holes 34.

The metal shell 30 is assembled to the insulating housing 10 from top to bottom, with the upright slice 310 inserting into the gap 16 of the insulating hosing 10, the long holes 311 being upon of the contacts 20, the holes 312 engaging with corresponding raised rids 121 of the insulting housing 10, the latching holes 34 engaging with the protrusive ribs 15, the metal shell 30 is reliably assembled to the insulating housing 10 by said engagements therebetween. Furthermore, two soldering pegs 35 are formed on opposed sides of the front end of the metal shell 30 for being soldered to the print circuit board (not shown), wherein the soldering peg 35 on the right extends into the groove 17 of the insulating housing 10.

Figure 5:
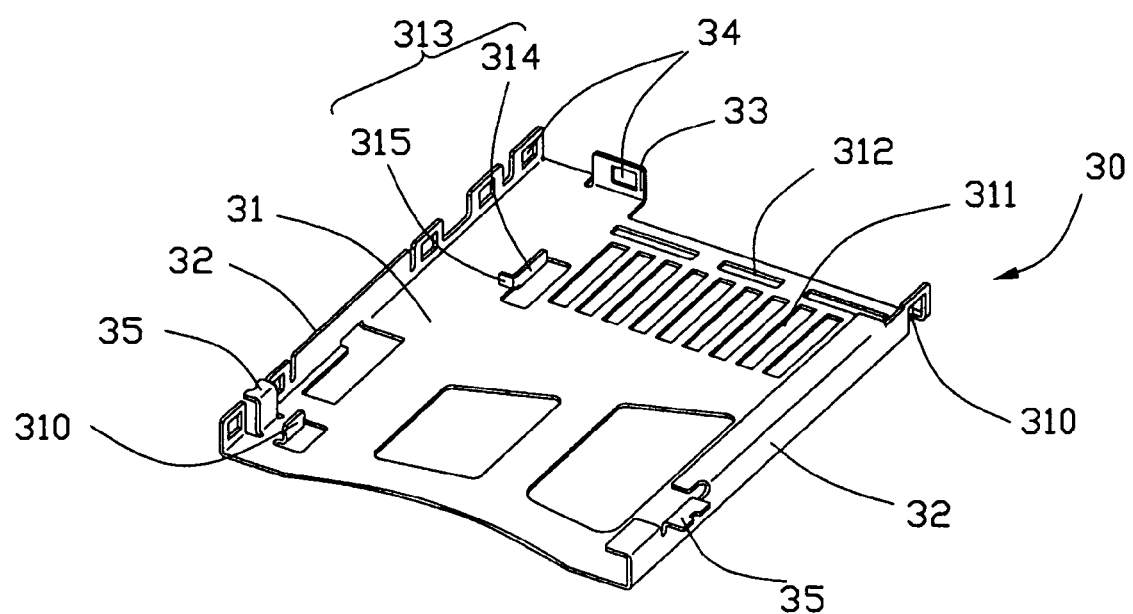
FIG. 5 is a perspective view of the shell of the card connector taken from a bottom side.

Referring to FIG. 2, combined with FIG. 5, a receiving space 18 is defined by the metal shell 30 and the insulating housing 10 together, the card 100 inserts into the receiving space 18 by guiding of the sidewall of rear portion 14 of the insulating housing 10 and the guiding slot 320 of the metal shell 30. The top plate 31 of the metal shell 30 further provides an elastic arm 313 in a top right corner. The elastic arm 313 has a first portion 314 extending along a card insertion direction and a second portion 315 extending in a direction vertical to the first portion 314, the second portion 315 links with the first portion 314 and contacts the front edge of the card 100 directly.

Figure 6:
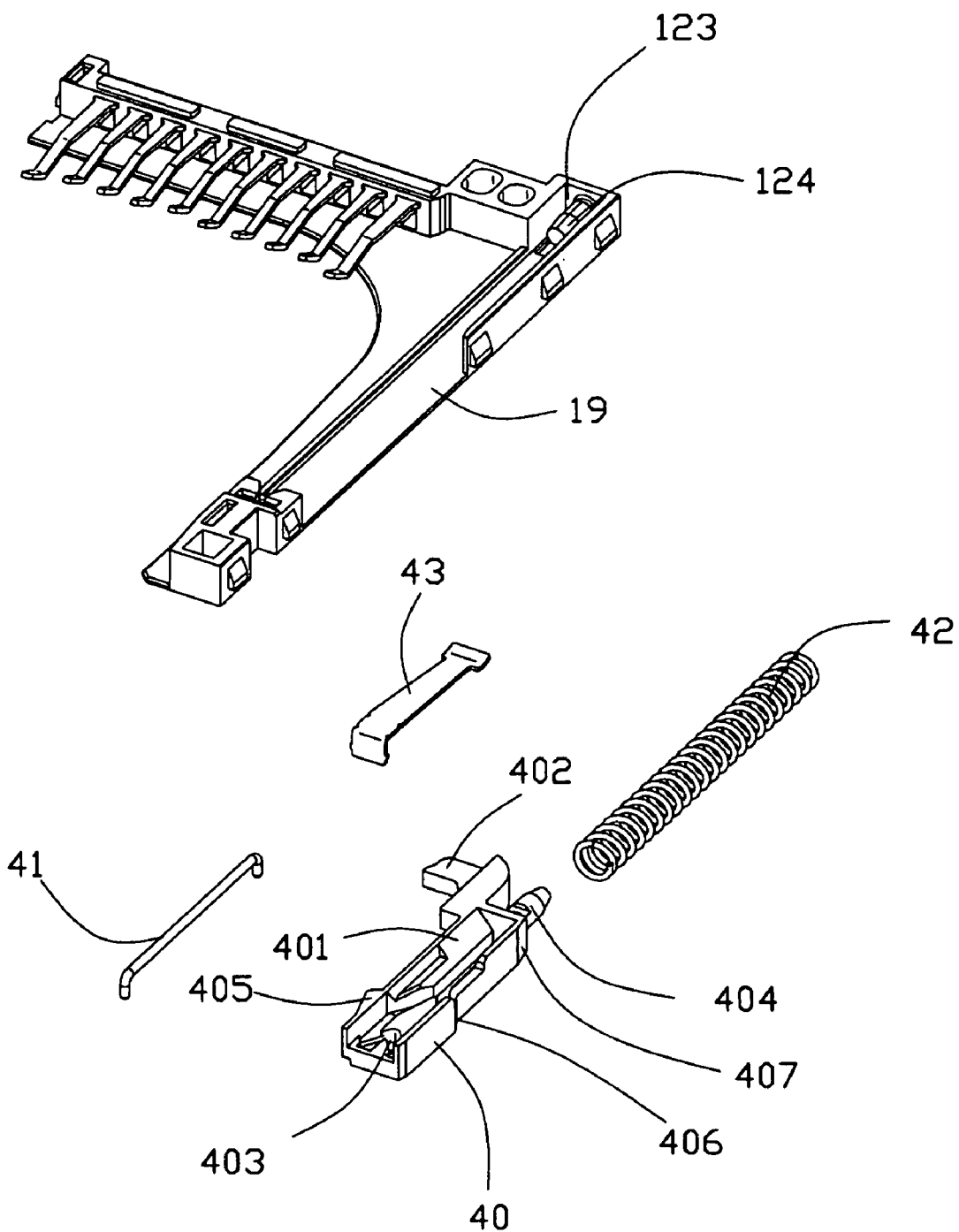
FIG. 6 is an exploded perspective view of the insulating housing and an ejector shown in FIG. 4.

Referring to FIG. 4 and FIG. 6, the ejector used for ejecting the card 100 out of the card connector comprises a slider 40, a pin member 41, a spring member 42 and a pressing member 43. The slider 40 is received in a slot (not labeled) defined by the bottom plate 11 of the insulating housing 10 between the rear portion 14 and the front wall 12 and moveable along the insertion/ejecting direction of the card 100.

The slider 40 is a one-piece element and comprises a base 401, an ejecting arm 402, a heart-shaped groove 403 recessed from a top surface thereof and a column 404 formed on a front end of the base 401. The pin member 41 is a metal pole with two opposed end bended toward a same direction, one end retained to the rear portion 14 and the other movably disposed in the heart-shaped groove 403, by this way, the heart-shaped groove 403 and the pin member 404 form a locking member for locking the slider 40 and the card 100 at a final position. The spring member 42 is positioned between the slider 40 and the front wall 12 of the insulating housing 10, two ends of the spring member 42 respectively surround the columns 404, 124, wherein the front end is received into the limit slot 123 of the insulating housing 10. The pressing member 43 has a retaining portion 430 fixed to the aperture 140 of the insulating housing 10 and a cantilever 431 extending upward from the retaining portion 430 for pressing the guiding pin 41 to prevent the guiding pin 41 from jumping out from the heart-shaped groove 403.

Figure 7:
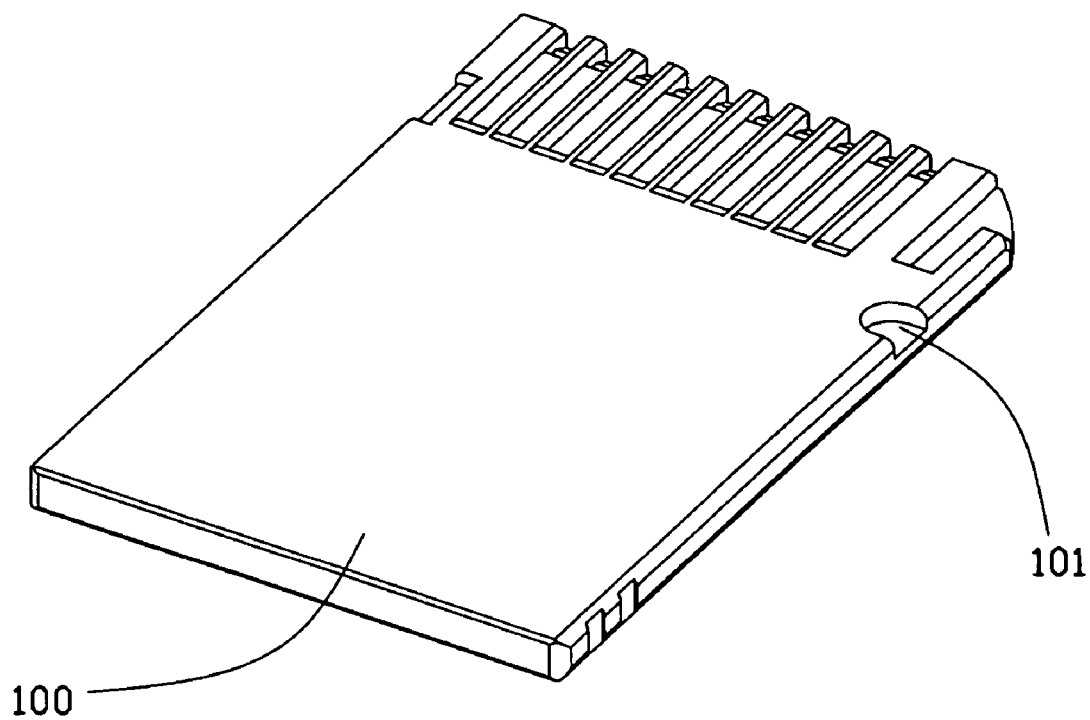
FIG. 7 is a perspective view of the card.

Referring to FIGS. 3-4, combined-with FIG. 7, the card 100 defines a notch 101 on a side adjacent to the slider 40, a protruding block 405 is protruding toward the receiving space 18 from an inner side of the slider 40 for engaging with the notch 101 of the card 100. A step face 406 is formed on an outside surface of the slider 40 and divides the slider into a front portion with a narrow width and a rear portion with a wider width. During the card 100 inserting into the card connector, the front portion of the slider 40 in a narrow width is able to insert into an inner side of the right sidewall 13, and the step face 406 abuts the right sidewall 13 in the card insertion direction. The front portion has a guiding face 407 for guiding the slider 40 to the inner side of the right sidewall 13. The outside surface of the rear portion of the slider 40 is approximately in a same line with the outside surface of the right sidewall 13.

The insulating housing 10 defines a space 19 which is a interspace between the right sidewall 13 and the rear portion 14. The space 19 is face to the slider 40 at a original position, and a size of the space 19 allows the slider 40 to move outwardly through. The sidewall 32 of the metal shell 30 has an elastic piece 321 for covering the space 19 from a side face and abutting on the slider 40. During the insertion of the card 100 into the receiving space 18, an side edge of the card 100 pushes the protruding block 405 of the slider 40, the slider 40 is forced to move outwardly through the space 19 and outwardly push the elastic piece 321 of the metal shell 30. When the front end of the card 100 touches the ejecting arm 41, the protruding block 405 will face to the notch 101 of the card 100 and enter the notch 100 in virtue of a resilience of the elastic piece 321, simultaneity, the slider 40 come back to the slot (not labeled) of the insulating housing 10 by a restoration elasticity of the elastic piece 321. Then, the card 100 continues inserting forwardly with the slider 40 moving together, the spring 42 is compressed, the pin member 41 moves along the heart-shaped groove 403. When the card 100 inserts into the card connector completely, the card 100 electrically contact with the contact 20, the pin member 41 and the heart-shaped groove 403 lock the card 100 and the slider 40 at the final position. In this position, the front portion of the slider 40 is completely set in the inner side of the right sidewall 13, so the slider 40 is limited to move outwardly by the right sidewall 13, and the protruding block 405 is kept in the notch 101 reliably and prevented from being pull out by mistake.

Pushing the card 100 forwardly again to release the locking member, then the card 100 and the slider 40 are pushed rearward to the original position by an elasticity of the spring member 42, and the card 100 may easily be pulled out from the receiving space 18 when the slider 40 arrives the original position where the slider 40 is able to move outwardly through the space 19 of the insulating housing 10. The elastic piece 321 of the metal shell 30 used for pressing the slider 40 may be replaced by other shape, such as a spring arm similar to the pressing member 43 in this embodiment of the present invention.

While a preferred embodiment in accordance with the present invention has been shown and described, equivalent modifications and changes known to persons skilled in the art according to the spirit of the present invention are considered within the scope of the present invention as described in the appended claims.

What is claimed is:

1. A card connector adapted for receiving a card which has a notch on a side, comprising:
   an insulating housing defining a card insertion/ejecting direction;
   a plurality of contacts retained in the insulating housing, each contact comprising a contacting portion, a retaining portion retained to the insulating housing and a soldering portion;
   an ejector received in the insulating housing and comprising a slider movable along the card insertion/ejecting direction, a spring member urging the slider toward the card ejecting direction and a locking member locking the slider, the slider defining an original position and a final position related to the insulating housing and having an ejecting arm ejecting the card and a protruding portion for engaging with the notch of the card, the slider being movable away from the card inserted into the card connector at the original position to allow the protruding portion to leave the notch of the card;
   wherein the slider is prevented from moving away from the card received in the card connector at the final position to lock the protruding portion of the slider in the notch of the card.

2. The card connector as described in claim 1, wherein the insulating housing has a sidewall and defines a space in a lateral side thereof, the slider of the ejector is able to move outwardly through the space at the original position and the sidewall is able to prevent the slider from moving outwardly at the final position.

3. The card connector as described in claim 2, further comprising a metal shell covering the insulating housing and defining a receiving space for the card together with the insulating housing, the metal shell has an elastic piece for pressing the slider moving outwardly back toward the receiving space.

4. The card connector as described in claim 2, further comprising an elastic piece covering the space from an out side surface and providing a restoration elasticity for pressing the slider moving outwardly back.

5. The card connector as described in claim 2, wherein the insulating housing is in an L-shape and comprises an L-shaped bottom plate, the sidewall and a front wall connecting with the sidewall.

6. The card connector as described in claim 2, wherein the slider is a one-piece member and comprises a base, the ejecting arm, the protruding portion and a heart groove recessed from a surface of the base, the protruding portion is a protruding block, the locking member is composed by the heart groove and the pin member.

7. The card connector as described in claim 6, wherein the slider is formed with a step face on an outside surface of a sidewall thereof, the step face divides the slider into a front portion with a narrow width and a rear portion with a wider width.

8. The card connector as described in claim 7, wherein the front portion of the slider is positioned in an inner side of the sidewall of the insulating housing, and the step face abuts the sidewall when the slider arrives to the final position.

9. A card connector adapted for receiving a card which has a notch on a side, comprising:
   an insulating housing receiving a plurality of contacts contacting with the card and defining a space in a lateral side thereof;
   a metal shell covering the insulating housing and defining a receiving space for the card and a card insertion/ejecting direction together with the insulating housing;
   an ejector comprising a slider movable along the card insertion/ejecting direction, a spring member urging the slider toward the card ejecting direction and a pin member, the slider formed with an ejecting arm ejecting the card received in the card connector, a heart groove forming a locking member together with the pin member and a protruding portion engaging with the notch of the card, the slider able to move outwardly through the space of the insulating housing at an original position during the card inserting into the receiving space;
   wherein the slider is limited to move outwardly at a final position where the locking member locks the slider, and the protruding portion of the slider is locked in the notch of the card to prevent the card from being pulled out form the final position.

10. The card connector as described in claim 9, further comprising an elastic piece covering the space from an out side surface and providing a restoration elasticity for pressing the slider back.

11. The card connector as described in claim 10, wherein the metal shell provides the elastic piece.

12. The card connector as described in claim 9, wherein the insulating housing is in an L-shape and comprises an L-shaped bottom plate, a sidewall a front wall and a rear portion in a bottom corner, the space is an interspace between the sidewall and the rear portion.

13. The card connector as described in claim 12, wherein the slider is a one-piece member and comprise a base formed with a heart groove, the ejecting arm and the protruding portion.

14. A card connector assembly comprising:
   an electronic card having a notch on one side edge thereof;
   an insulating housing defining a card insertion/ejecting direction;
   a metallic shell assembled to the housing and cooperating with the housing to define a card receiving space;
   a plurality of contacts retained in the insulating housing, each of said contacts defining a contacting portion; and
   an ejector located beside the card receiving space and comprising a slider movable along the card insertion/ejecting direction, a spring member urging the slider toward the card ejecting direction and a locking member locking the slider, the slider defining an original position and a final position related to the insulating housing and having an ejecting arm ejecting the card and a protruding portion latchably engaging with the notch of the card, the slider being movable away from the card inserted into the card connector at the original position to allow the protruding portion to leave the notch of the card under a condition that the protruding portion is immoveable relative to the slider;
   wherein said ejector is disposed in an area confined by the housing under a condition that confinement of the housing with regard to the slider is terminated when said slider is at the original position.

* * * * *